United States Patent [19]
Hein

[11] 3,858,483
[45] Jan. 7, 1975

[54] PRESSURE RELIEF EXPANSION CHAMBER FOR HYDROSTATIC MOTORS

[75] Inventor: Allyn J. Hein, Joliet, Ill.

[73] Assignee: Caterpillar Tractor Co., Peoria, Ill.

[22] Filed: Apr. 18, 1973

[21] Appl. No.: 352,359

[52] U.S. Cl. .................................. 91/6.5, 91/486
[51] Int. Cl. ............................................ F01b 13/04
[58] Field of Search ............. 91/6.5, 485, 488, 487, 91/505

[56] References Cited
UNITED STATES PATENTS

| | | | |
|---|---|---|---|
| 2,642,809 | 6/1953 | Born | 91/6.5 |
| 2,847,938 | 8/1958 | Goudek | 91/488 |
| 3,040,672 | 6/1962 | Foerster et al. | 91/487 |
| 3,094,078 | 6/1963 | Brueder | 91/6.5 |
| 3,177,666 | 4/1965 | Reinke | 91/505 |
| 3,199,461 | 8/1965 | Wolf | 91/6.5 |
| 3,208,397 | 9/1965 | Lehrer | 91/6.5 |
| 3,289,606 | 12/1966 | Bosch | 91/485 |

Primary Examiner—William L. Freeh
Attorney, Agent, or Firm—Phillips, Moore, Weissenberger, Lempio & Strabala

[57] ABSTRACT

An improved cylinder head for hydrostatic motors of the type having a cylinder barrel defining a plurality of piston bores with the cylinder barrel being rotatable relative to the head for periodically communicating the piston bores with fluid inlet and outlet passages, a portion of the cylinder head forming an expansion chamber and a restrictive orifice for communicating the chamber with each cylinder bore just prior to its respective piston reaching a limit of reciprocation within the bore, fluid flow from the expansion chamber being controlled to provide lubrication for the motor.

7 Claims, 4 Drawing Figures

PRESSURE RELIEF EXPANSION CHAMBER FOR HYDROSTATIC MOTORS

BACKGROUND OF THE INVENTION

The present invention relates to an improved cylinder head for a hydraulic or hydrostatic motor. More particularly, the invention relates to an improved cylinder head for a motor of the type employed, for example in a hydrostatic transmission system where the power output of a prime mover may be transmitted to a driven element by means of fluid pressure in a closed hydraulic loop. Hydrostatic transmissions of this type are commonly employed in a variety of applications to provide a power transmission system where there is no direct mechanical connection between the power source and the powered equipment.

A basic hydrostatic transmission may consist, for example, of a hydraulic pump which is driven by a prime mover and a hydraulic motor which is driven by fluid pressure from the pump. Usually, the pump is of a variable displacement type. By regulating the displacement of the pump, the speed of the motor may be controlled over a broad speed range in either direction. The motor also may be of a variable displacement type to facilitate a wide range of transmission speed ratios with high efficiency.

The present invention is particularly directed toward a motor used within such a transmission. The motor commonly employs a cylinder head for selectively and periodically communicating fluid under pressure to piston bores in a rotating cylinder barrel of the motor. As each piston reaches a limit of reciprocable motion and begins to compress fluid in the bore, the cylinder head communicates the bore with a fluid drain to release pressure from the bore. However, as the piston reaches its limit of reciprocable motion and begins to move in the opposite direction, the operating load pressure is trapped within the piston bore. As the cylinder head then communicates the piston bore with a fluid drain, these very high pressures may tend to cause erosion within the cylinder head and may also cause undesirable noise or "knocking."

It has been known in the prior art to employ either check valves or bleed slots to initially relieve high fluid pressure trapped in the cylinder ports just prior to the port entering into communication with an outlet passage in the cylinder head. Although both of these methods have been found to reduce the problem of high fluid pressure, they have also illustrated certain deficiencies. For example, when bleed slots are used, they are subject to rapid erosion which tends to add contaminants to the hydraulic fluid, thus contributing to possible premature motor failure. Similarly, when check valves are employed to relieve high pressure in the cylinder ports, it is necessary to use a substantial number of additional parts within the motor. In addition, use of either check valves or bleed slots has been found to permit "knocking."

SUMMARY OF THE INVENTION

Accordingly, it is an object of the present invention to overcome one or more of the problems discussed above.

In particular, it is an object of the present invention to provide an improved cylinder head for hydraulic motors, the cylinder head including an expansion chamber for relieving high pressures trapped within piston bores of the motor as the pistons reach a limit of reciprocable motion and begin travelling in the opposite direction.

It is a further object of the present invention to adapt the cylinder heads so that fluid from the expansion chamber is employed for lubrication in various parts of the motor.

It has been found that use of an expansion chamber in the cylinder head results in a slight increase in effective displacement of the motor in comparison to designs utilizing check valves. The expansion chamber design is particularly effective in that the number of parts in the motor may be substantially reduced in comparison to prior art designs employing check valves for the same purpose.

Also, the present invention particularly contemplates the use of fluid from the expansion chamber to lubricate bearing pads between the cylinder barrel and the cylinder head. This feature of the invention is particularly desirable since the amount of fluid available from the expansion chamber increases when the motor is operating under the load. Accordingly, additional lubrication is supplied to the bearing pad area of the motor when it is most needed.

Additional objects and advantages of the present invention are made apparent in the following description having reference to the accompanying drawings.

DESCRIPTION OF A PREFERRED EMBODIMENT

Figure 1:
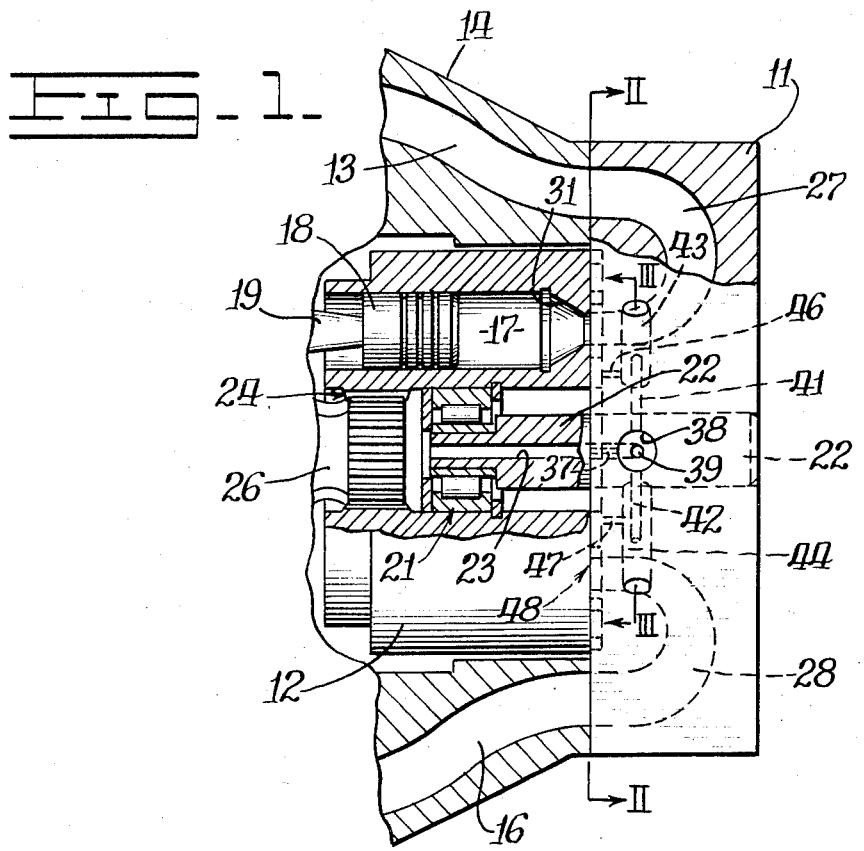
FIG. 1 is an axially sectioned view of a portion of a hydrostatic motor illustrating the arrangement of a cylinder barrel for rotation relative to the cylinder head of the motor.

The present invention particularly contemplates a hydrostatic motor of the type shown in FIG. 1. Only a portion of the hydrostatic motor is illustrated since the combination of a cylinder head 11 and a cylinder barrel 12 for the motor, together with closely associated parts as discussed below, is believed sufficient to clearly illustrate the construction and manner of operation for the invention.

For purposes of describing operation of the motor, it is also noted that a closed hydraulic loop may be conventionally formed between the motor and a pump (not shown), the pump supplying fluid under pressure to an inlet conduit 13 formed by a case body 14 for the motor of FIG. 1. Exhaust fluid from an outlet conduit 16 also formed by the body 14 is returned to the pump. The general manner of operation for the motor and pump within such a hydrostatic transmission is illustrated, for example, in U.S. Pat. No. 3,381,472, issued May 7, 1968, and assigned to the assignee of the present invention.

Referring now to FIG. 1, the cylinder barrel 12 of the hydrostatic motor forms a plurality of cylinder bores, one such bore being indicated at 17. A grooved piston 18 is reciprocably arranged within each of the bores 17 while being conventionally coupled to a connecting rod as partially indicated at 19.

The cylinder barrel 12 is supported for rotation by a bearing assembly 21 upon a stub shaft 22 secured to the cylinder head 11. The shaft 22 is formed with an axial passage 23 in communication with the bearing assembly 21 to provide lubrication in a manner described in greater detail below.

The cylinder barrel 12 is arranged in splined engagement at 24 with a yoke shaft 26 of a universal joint (not otherwise shown) to provide a conventional drive output for the motor of FIG. 1.

Figure 2:
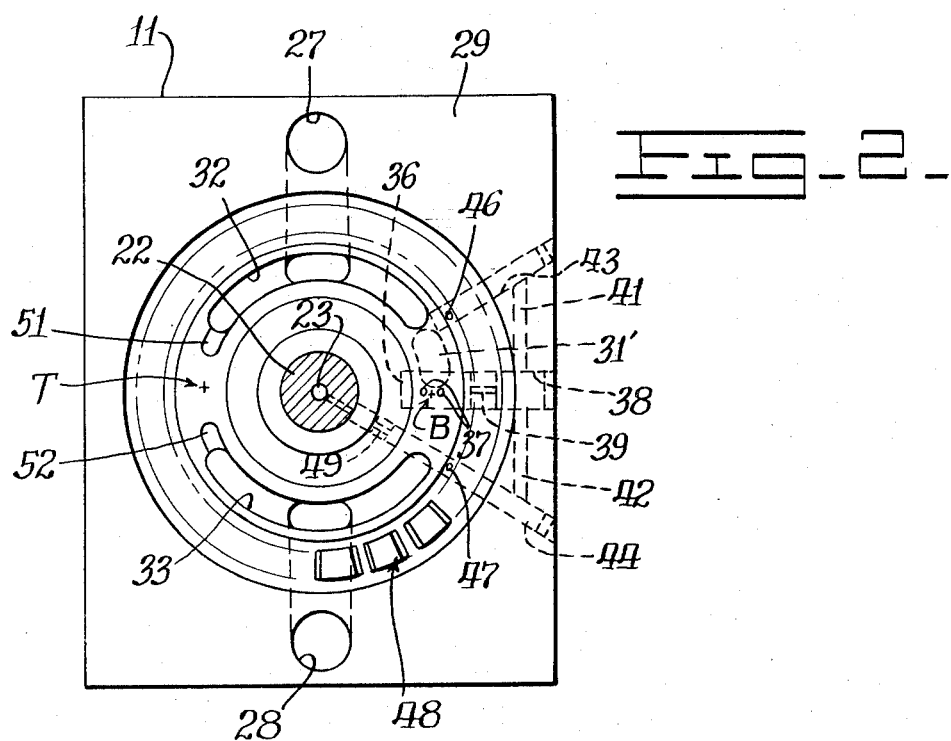
FIG. 2 is a view of the valve face of the cylinder head taken along section line II—II of FIG. 1.
Figure 3:
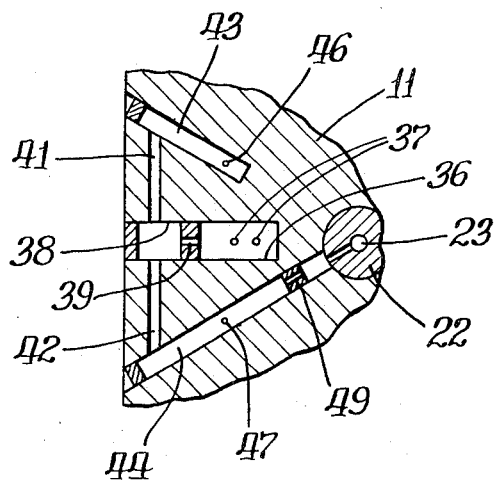
FIG. 3 is an enlarged view in section of a fragmentary portion of the cylinder head.

The cylinder head 11 forms an inlet port 27 and an outlet port 28 which, in combination with additional features on the valve face 29 of the cylinder head, selectively and periodically communicate the inlet and outlet conduits 13 and 16 with each of the cylinder bores 17. For that purpose, each of the cylinder bores 17 is formed with a port 31 which is in communication with the valve face 29 of the cylinder head. Referring momentarily to FIG. 2, the valve face 29 of the cylinder head 11 forms a circumferentially extending inlet slot 32 in communication with the inlet port 27 and a circumferentially extending outlet slot 33 in communication with the outlet port 28. The inlet and outlet slots 32 and 33 are arranged in diametric opposition in order to permit periodic and alternate communication of the cylinder ports 31 with the respective slots 32 and 33 (also see FIG. 1). It is to be particularly noted that the adjacent ends of the inlet and outlet slots 32 and 33 are spaced apart from each other so that each port 31 is out of communication with both of the slots 32 and 33 at selected intervals during relative rotation between the cylinder barrel 12 and the cylinder head 11.

One of the cylinder ports 31 is illustrated in phantom on FIG. 2 at 31'. When the port 27 is used as an inlet to supply fluid under pressure to the motor and the port 28 is used as an outlet for exhausting low pressure fluid from the motor, the cylinder barrel and the cylinder port illustrated in phantom at 31' rotate in a clockwise direction as viewed for example in FIG. 2. The conventional arrangement and interconnection of the motor illustrated in FIG. 1 provides for reciprocation of the pistons 18 according to rotation of the cylinder barrel 12 relative to the cylinder head 11. The motor arrangement is selected to provide for timing of piston reciprocation in the following manner. As the cylinder port 31 (see FIG. 2) is in communication with the inlet slot 32, fluid from the inlet conduit 13 enters the cylinder 17 and causes the piston 18 to be retracted or shifted toward the left as viewed in FIG. 1. As the port 31' passes out of communication with the inlet slot 32, the cylinder bore 17 is filled with high pressure trapped oil supplied by inlet port 27. It then approaches a position indicated in FIG. 2 at B. The point B is also commonly referred to as bottom dead center and corresponds to maximum retraction of the piston 18 to the left within the cylinder bore 17. As the port 31 rotates beyond the point indicated at B, the piston 18 reverses its direction of movement and extends or moves in a rightward direction as viewed in FIG. 1. As noted above, the port 31 is out of communication with both of the slots 32 and 33 when it is centered about the point indicated as B. Thus, as the piston 18 tends to shift to the right, fluid pressure within the cylinder bore 17 would be placed under further increased pressure. If that pressure were not relieved in some manner, it would be further increased until the port entered into communication with the slot 33. At that time, the highly pressurized fluid within the cylinder bore 17 would pass through the port 31 into the slot 33, tending to cause erosion within the slot 33 and resulting in undesirable "knocking" or noise generation as discussed above.

To overcome this problem, the present invention contemplates an expansion chamber formed within the cylinder head 11 as indicated at 36. Restrictive orifices indicated at 37 communicate the expansion chamber 36 with the cylinder head valve face 29 generally in radial alignment with the position indicated at B. Thus, before the port 31' is centered about the position indicated at B, the port is placed in communication with the orifices 37. The orifices 37 are selectively sized to control the passage of fluid under pressure from the cylinder bore 17 into the expansion chamber 36.

Additional passages are formed within the cylinder head to direct fluid from the expansion chamber 36 toward regions of the motor requiring lubrication. For this purpose, the expansion chamber 36 is in communication with another chamber 38 by means of a second restrictive orifice 39. Cross-drilled passages 41 and 42 communicate the chamber 38 with radially formed passages 43 and 44 respectively. The passages 43 and 44 have respective outlet orifices 46 and 47 arranged for communicating fluid to a bearing pad area indicated at 48 which maintains alignment between the cylinder head 11 and the cylinder barrel 12.

Thus, fluid from the expansion chamber 36 passes into the chamber 38 through the orifice 39 and enters the radial passages 43 and 44 through the cross-drilled passages 41 and 42. It will be apparent from the manner of operation for the motor, as described above, that the supply of fluid available in the passages 43 and 44 from the expansion chamber 36 increases as the motor is operating under an additional load and increased speed. Thus, the supply of fluid to the bearing 48 through the orifices 46 and 47 is correlated with lubrication requirements for the bearing.

It is further contemplated that additional fluid be supplied to other internal portions of the motor for lubrication. For this purpose, the radial passage 44 is in communication with the axial passage 23 in the shaft 22 (see FIG. 1) by means of still another restrictive orifice 49. Fluid crossing the orifice 49 and entering the passage 23 is available to lubricate the universal joint represented by the yoke shaft 26 of FIG. 1, for example, as well as other internal portions of the motor. The orifice 39 is selectively sized to assure an adequate supply of fluid for lubricating the bearing 48 through the orifice 47.

In this manner, during normal operation of a motor operating under load, the bearing assembly 48 receives a majority of its lubricating fluid from the expansion chamber 36 in the manner described above. When the motor is being operated at or near a low-load condition, the low pressure supply of fluid from the expansion chamber 36 continues to provide limited lubrication for the bearing assembly 48 which is adequate for those operating conditions.

It is noted again that the orifices 37, the orifice 39, and the orifices 46 and 47 are all sized so that high fluid pressure in the cylinder bore 17 is bled off at a controlled rate to eliminate "knocking" and prevent fluid from entering the exhaust slot 33 at a high velocity which would tend to cause erosion.

In motors of the type illustrated in FIG. 1, it is sometimes desirable to operate the motor in a reverse direction. Under such circumstances, the slot 33 acts as a high pressure or inlet side and the slot 32 becomes a low pressure or exhaust side because of the reversed direction of fluid flow from the pump in the conduits 13 and 16. Referring particularly to FIG. 2, the port 31' would be rotating in a counterclockwise direction during such reverse operation. During reverse operation, point B remains bottom dead center and the operation of the expansion chamber is identical to that described for forward rotation, except for the port 31' approaching point B from the opposite direction.

Conventional bleed slots 51 and 52 are arranged in communication with the slots 32 and 33 as shown in FIG. 2 to maintain a minimum seal at top dead center when the cylinder port 31' is centered about the point T and has just passed out of communication with the outlet slot 33 and just prior to opening into communication with the inlet slot 32. The bleed slots serve adequately at top dead center during rotation in either direction. The cylinder volume is small at top dead center and the bleed slots can be sized to limit the entering fluid velocity to a low value. For this reason, there is little tendency for erosion at top dead center of the motor.

Figure 4:
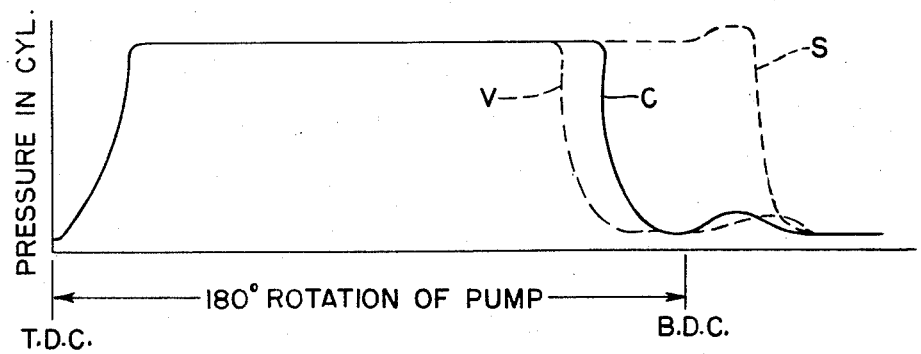
FIG. 4 is a graphical representation of fluid pressures developed within the motor.

The curves represented in FIG. 4 illustrate the variation of pressure within the motor cylinder 17 during the rotation to 180° from a position corresponding to top dead center, as indicated at T in FIG. 2, to the bottom dead center position indicated at B. The pressure trace indicated at C in FIG. 4 illustrates the variable pressure within the cylinder bore 17 when an expansion chamber of the type contemplated by the present invention is employed. Additional pressure traces are illustrated in phantom at S and V to demonstrate the corresponding effect on pressure in the bore 17 when conventional bleed slots or check valves are employed.

Referring to the pressure trace S, the use of bleed slots permits the extraction of more useful work from the fluid prior to the bottom dead center position. However, the cylinder ports 31 (see FIG. 1) do not open to the bleed slots for a couple of degrees of rotation of the cylinder barrel after the bottom dead center position. Thus, with the use of bleed slots, the pistons would have to extend against high pressure, requiring the injection of work into the fluid rather than allowing work extraction. This effect tends to nullify the additional work gained prior to arrival at the bottom dead center position with the use of bleed slots.

It is also noted that with the use of either the expansion chamber according to the present invention, as represented by the trace C, or with the use of check valves as represented by the trace V, or with use of bleed slots represented by trace S, a small hump develops in the pressure traces just subsequent to passage of the port 31 beyond the bottom dead center position. This effect results from limited recompression of fluid in the cylinder bore 17 prior to its opening into communication with the low pressure side of the cylinder head. This characteristic is noted particularly for purposes of explanation.

The analysis of the curves illustrated in FIG. 4, as set forth above, thus indicates that optimum work may be obtained from fluid pressure in the piston bores 17 through the use of expansion chambers as contemplated by the present invention.

I claim:

1. In a cylinder head of a type suitable for mounting relative to a rotatable cylinder barrel of a hydraulic motor, the cylinder barrel having a plurality of bores reciprocably mounting respective pistons, the cylinder head having inlet and outlet ports circumferentially arranged in a valve face of the cylinder head for periodic communication with the piston bores, reciprocation of the pistons being timed in accordance with relative rotation between the cylinder head and cylinder barrel, the improvement comprising a portion of the cylinder head forming an expansion chamber, the cylinder head also forming a restrictive orifice for communicating the expansion chamber with the valve face of the cylinder head at a point intermediate the inlet and outlet ports, the point being selected for communication with each cylinder bore just prior to its respective piston reaching a limit of reciprocation within the bore, the restrictive orifice being selectively sized to control the rate of pressure equalization between the respective cylinder bore and the expansion chamber, and further comprising means for communicating fluid from the expansion chamber to bearing means arranged between the cylinder head and the cylinder barrel.

2. The cylinder head of claim 1 wherein the motor is of a type suited for use in a hydrostatic transmission.

3. The cylinder head of claim 1 further comprising an additional restrictive orifice for limiting the fluid communication from the expansion chamber to the bearing area.

4. In a cylinder head of a type suitable for mounting relative to a rotatable cylinder barrel of a hydraulic motor, the cylinder barrel having a plurality of bores reciprocably mounting respective pistons, the cylinder head having inlet and outlet ports circumferentially arranged in a valve face of the cylinder head for periodic communication with the piston bores, reciprocation of the pistons being timed in accordance with relative rotation between the cylinder head and cylinder barrel, the improvement comprising a portion of the cylinder head forming an expansion chamber, the cylinder head also forming a restrictive orifice for communicating the expansion chamber with the valve face of the cylinder head at a point intermediate the inlet and outlet ports, the point being selected for communication with each cylinder bore just prior to its respective piston reaching a limit of reciprocation within the bore, the restrictive orifice being selectively sized to control the rate of pressure equalization between the respective cylinder bore and the expansion chamber, and further comprising means for communicating fluid from the expansion chamber to internal bearings of the motor.

5. The cylinder head of claim 4 further comprising an additional restrictive orifice for regulating the rate of fluid flow from the expansion chamber to the internal bearings of the motor.

6. The cylinder head of claim 5 wherein the motor is of the type suited for use in a hydrostatic transmission.

7. In a hydrostatic motor of a type having a cylinder head mounted for use with a rotatable cylinder barrel, the cylinder barrel having a plurality of bores reciprocably mounting pistons, the cylinder head having inlet and outlet ports circumferentially arranged on a valve face of the cylinder head for periodic communication with the piston bores, reciprocation of the pistons being timed in accordance with relative rotation between the cylinder head and the cylinder barrel, the improvement comprising a portion of the cylinder head forming an expansion chamber, the cylinder head also forming a restricted orifice for communicating the chamber with the valve face of the cylinder head at a point intermediate the inlet and outlet ports, the point being selected for communication with each cylinder bore just prior to its respective piston reaching a limit of reciprocation within the bore, the restrictive orifice being selectively sized to control the rate of pressure equalization between the respective cylinder bore and the chamber, and means communicating the expansion chamber with bearing means in the motor and forming a restrictive orifice for regulating the rate of fluid flow from the expansion chamber toward the bearing means.

* * * * *